United States Patent
Cur et al.

(10) Patent No.: US 9,140,481 B2
(45) Date of Patent: Sep. 22, 2015

(54) FOLDED VACUUM INSULATED STRUCTURE

(71) Applicant: Whirlpool Corporation, Benton Harbor, MI (US)

(72) Inventors: Nihat Cur, Saint Joseph, MI (US); Guolian Wu, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 294 days.

(21) Appl. No.: 13/836,669

(22) Filed: Mar. 15, 2013

(65) Prior Publication Data

US 2013/0305535 A1 Nov. 21, 2013

Related U.S. Application Data

(60) Provisional application No. 61/618,914, filed on Apr. 2, 2012.

(51) Int. Cl.
| | |
|---|---|
| *F25D 23/06* | (2006.01) |
| *F25D 23/08* | (2006.01) |
| *F25D 23/02* | (2006.01) |
| *F25B 39/00* | (2006.01) |
| *F25D 11/00* | (2006.01) |
| *B29C 53/00* | (2006.01) |

(52) U.S. Cl.
CPC .............. *F25D 23/063* (2013.01); *B29C 53/00* (2013.01); *F25B 39/00* (2013.01); *F25D 11/00* (2013.01); *F25D 23/028* (2013.01); *F25D 23/062* (2013.01); *F25D 23/065* (2013.01); *F25D 2201/14* (2013.01); *Y10T 29/49002* (2015.01); *Y10T 29/49359* (2015.01); *Y10T 29/49826* (2015.01); *Y10T 29/49879* (2015.01); *Y10T 29/49947* (2015.01)

(58) Field of Classification Search
CPC ....... B29C 52/00; F25B 39/00; F25D 23/062; F25D 23/063; F25D 23/065; F25D 11/00; F25D 2201/14; Y10T 29/49947; Y10T 29/49826; Y10T 29/49879
See application file for complete search history.

(56) References Cited

U.S. PATENT DOCUMENTS

| | | | |
|---|---|---|---|
| 1,676,094 A | * | 7/1928 | Knox .......................... 52/302.1 |
| 2,108,212 A | | 2/1938 | Schellens |
| 2,128,336 A | | 8/1938 | Torstensson |

(Continued)

FOREIGN PATENT DOCUMENTS

| | | |
|---|---|---|
| CA | 1320631 | 7/1993 |
| CA | 2259665 | 1/1998 |

(Continued)

OTHER PUBLICATIONS

European Patent Application No. 14158608.1 filed Mar. 10, 2014, Applicant: Whirlpool Corporation, European Search re: same, mail date: Oct. 14, 2014, 5 pages.

(Continued)

*Primary Examiner* — Alexander P Taosakis (57) ABSTRACT

A vacuum insulated cabinet structure for refrigerators and the like includes a plurality of vacuum insulated panels. The cabinet structure may include an "O" or "U" structure that is formed by folding a large panel assembly. The panels may comprise side walls that are heat-sealed together around the perimeters of the panels to form air-tight spaces having a vacuum.

15 Claims, 7 Drawing Sheets

(56) References Cited

U.S. PATENT DOCUMENTS

| | | | |
|---|---|---|---|
| 2,164,143 A | 6/1939 | Munters | |
| 2,318,744 A | 5/1943 | Brown | |
| 2,356,827 A | 8/1944 | Coss et al. | |
| 2,439,602 A | 4/1948 | Heritage | |
| 2,439,603 A | 4/1948 | Heritage | |
| 2,559,356 A | 7/1951 | Hedges | |
| 2,768,046 A | 10/1956 | Evans | |
| 2,817,123 A | 12/1957 | Jacobs | |
| 2,985,075 A | 5/1961 | Knutsson-Hall | |
| 3,125,388 A | 3/1964 | Costantini et al. | |
| 3,137,900 A | 6/1964 | Carbary | |
| 3,258,883 A | 7/1966 | Campanaro et al. | |
| 3,358,059 A | 12/1967 | Snyder | |
| 3,379,481 A | 4/1968 | Fisher | |
| 3,635,536 A | 1/1972 | Lackey et al. | |
| 3,688,384 A | 9/1972 | Mizushima et al. | |
| 3,989,329 A * | 11/1976 | Benford | 312/406 |
| 4,006,947 A * | 2/1977 | Haag et al. | 312/406 |
| 4,043,624 A | 8/1977 | Lindenschmidt | |
| 4,050,145 A | 9/1977 | Benford | |
| 4,067,628 A | 1/1978 | Sherburn | |
| 4,332,429 A | 6/1982 | Frick et al. | |
| 4,417,382 A | 11/1983 | Schilf | |
| 4,660,271 A | 4/1987 | Lenhardt | |
| 4,662,521 A * | 5/1987 | Moretti | 206/484.2 |
| 4,671,985 A | 6/1987 | Rodrigues et al. | |
| 4,805,293 A | 2/1989 | Buchser | |
| 4,917,841 A | 4/1990 | Jenkins | |
| 5,007,226 A | 4/1991 | Nelson | |
| 5,033,636 A | 7/1991 | Jenkins | |
| 5,066,437 A | 11/1991 | Barito et al. | |
| 5,082,335 A | 1/1992 | Cur et al. | |
| 5,175,975 A | 1/1993 | Benson et al. | |
| 5,221,136 A | 6/1993 | Hauck et al. | |
| 5,248,196 A | 9/1993 | Lynn et al. | |
| 5,252,408 A | 10/1993 | Bridges et al. | |
| 5,263,773 A | 11/1993 | Gable et al. | |
| 5,273,801 A * | 12/1993 | Barry et al. | 428/69 |
| 5,359,795 A | 11/1994 | Mawby et al. | |
| 5,507,999 A | 4/1996 | Copsey et al. | |
| 5,509,248 A | 4/1996 | Dellby et al. | |
| 5,512,345 A | 4/1996 | Tsutsumi et al. | |
| 5,586,680 A | 12/1996 | Dellby et al. | |
| 5,632,543 A * | 5/1997 | McGrath et al. | 312/406 |
| 5,640,828 A | 6/1997 | Reeves et al. | |
| 5,652,039 A | 7/1997 | Tremain et al. | |
| 5,716,581 A | 2/1998 | Tirrell et al. | |
| 5,827,385 A | 10/1998 | Meyer et al. | |
| 5,843,353 A * | 12/1998 | De Vos et al. | 264/102 |
| 5,866,228 A | 2/1999 | Awata | |
| 5,900,299 A | 5/1999 | Wynne | |
| 5,924,295 A | 7/1999 | Park | |
| 5,985,189 A | 11/1999 | Lynn et al. | |
| 6,109,712 A * | 8/2000 | Haworth et al. | 312/400 |
| 6,128,914 A | 10/2000 | Tamaoki et al. | |
| 6,132,837 A | 10/2000 | Boes et al. | |
| 6,158,233 A | 12/2000 | Cohen et al. | |
| 6,164,030 A | 12/2000 | Dietrich | |
| 6,220,473 B1 | 4/2001 | Lehman et al. | |
| 6,224,179 B1 | 5/2001 | Wenning et al. | |
| 6,260,377 B1 | 7/2001 | Tamaoki et al. | |
| 6,305,768 B1 | 10/2001 | Nishimoto | |
| 6,406,449 B1 | 6/2002 | Moore et al. | |
| 6,408,841 B1 | 6/2002 | Hirath et al. | |
| 6,415,623 B1 | 7/2002 | Jennings et al. | |
| 6,460,955 B1 * | 10/2002 | Vaughan et al. | 312/401 |
| 6,623,413 B1 | 9/2003 | Wynne | |
| 6,651,444 B2 | 11/2003 | Morimoto et al. | |
| 6,773,082 B2 | 8/2004 | Lee | |
| 6,938,968 B2 * | 9/2005 | Tanimoto et al. | 312/406 |
| 6,997,530 B2 | 2/2006 | Avendano et al. | |
| 7,210,308 B2 | 5/2007 | Tanimoto et al. | |
| 7,278,279 B2 | 10/2007 | Hirai et al. | |
| 7,284,390 B2 | 10/2007 | Van Meter et al. | |
| 7,296,432 B2 | 11/2007 | Muller et al. | |
| 7,316,125 B2 | 1/2008 | Uekado et al. | |
| 7,343,757 B2 | 3/2008 | Egan et al. | |
| 7,537,817 B2 | 5/2009 | Tsunetsugu et al. | |
| 7,641,298 B2 | 1/2010 | Hirath et al. | |
| 7,762,634 B2 | 7/2010 | Tenra et al. | |
| 7,815,269 B2 | 10/2010 | Wenning et al. | |
| 7,861,538 B2 | 1/2011 | Welle et al. | |
| 7,886,559 B2 * | 2/2011 | Hell et al. | 62/298 |
| 7,908,873 B1 | 3/2011 | Cur et al. | |
| 7,930,892 B1 | 4/2011 | Vonderhaar | |
| 8,083,985 B2 | 12/2011 | Luisi et al. | |
| 8,113,604 B2 | 2/2012 | Olson et al. | |
| 8,117,865 B2 | 2/2012 | Allard et al. | |
| 8,202,599 B2 | 6/2012 | Henn | |
| 8,281,558 B2 | 10/2012 | Hiemeyer et al. | |
| 8,353,177 B2 | 1/2013 | Adamski et al. | |
| 8,790,477 B2 | 7/2014 | Tenra et al. | |
| 8,881,398 B2 | 11/2014 | Hanley et al. | |
| 8,927,084 B2 | 1/2015 | Jeon et al. | |
| 2002/0144482 A1 * | 10/2002 | Henson et al. | 52/631 |
| 2002/0168496 A1 | 11/2002 | Morimoto et al. | |
| 2003/0008100 A1 | 1/2003 | Horn | |
| 2004/0178707 A1 | 9/2004 | Avendano et al. | |
| 2004/0180176 A1 | 9/2004 | Rusek, Jr. | |
| 2004/0253406 A1 | 12/2004 | Hayashi et al. | |
| 2005/0235682 A1 | 10/2005 | Hirai et al. | |
| 2006/0076863 A1 | 4/2006 | Echigoya et al. | |
| 2006/0201189 A1 | 9/2006 | Adamski et al. | |
| 2006/0263571 A1 | 11/2006 | Tsunetsugu et al. | |
| 2007/0001563 A1 | 1/2007 | Park et al. | |
| 2007/0099502 A1 | 5/2007 | Ferinauer et al. | |
| 2008/0309210 A1 | 12/2008 | Luisi et al. | |
| 2009/0056367 A1 | 3/2009 | Neumann | |
| 2009/0058244 A1 | 3/2009 | Cho et al. | |
| 2009/0113925 A1 | 5/2009 | Korkmaz | |
| 2009/0179541 A1 | 7/2009 | Smith et al. | |
| 2009/0324871 A1 | 12/2009 | Henn | |
| 2010/0293984 A1 | 11/2010 | Adamski et al. | |
| 2010/0295435 A1 | 11/2010 | Kendall et al. | |
| 2011/0030894 A1 | 2/2011 | Tenra et al. | |
| 2011/0146335 A1 | 6/2011 | Jung et al. | |
| 2011/0165367 A1 | 7/2011 | Kojima et al. | |
| 2011/0241513 A1 | 10/2011 | Nomura et al. | |
| 2011/0241514 A1 | 10/2011 | Nomura et al. | |
| 2011/0260351 A1 | 10/2011 | Corradi et al. | |
| 2011/0290808 A1 | 12/2011 | Bai et al. | |
| 2011/0315693 A1 | 12/2011 | Cur et al. | |
| 2012/0000234 A1 | 1/2012 | Adamski et al. | |
| 2012/0103006 A1 | 5/2012 | Jung et al. | |
| 2012/0104923 A1 | 5/2012 | Jung et al. | |
| 2012/0118002 A1 | 5/2012 | Kim et al. | |
| 2012/0137501 A1 | 6/2012 | Allard et al. | |
| 2012/0231204 A1 * | 9/2012 | Jeon et al. | 428/69 |
| 2012/0237715 A1 * | 9/2012 | McCracken | 428/69 |
| 2012/0273111 A1 | 11/2012 | Nomura et al. | |
| 2012/0279247 A1 | 11/2012 | Katu et al. | |
| 2012/0285971 A1 | 11/2012 | Junge et al. | |
| 2012/0297813 A1 * | 11/2012 | Hanley et al. | 62/331 |
| 2012/0324937 A1 | 12/2012 | Adamski et al. | |
| 2013/0221011 A1 * | 8/2013 | Yoon et al. | 220/592.1 |
| 2013/0255304 A1 | 10/2013 | Cur et al. | |
| 2013/0256318 A1 | 10/2013 | Kuehl et al. | |
| 2013/0256319 A1 | 10/2013 | Kuehl et al. | |
| 2013/0257256 A1 | 10/2013 | Allard et al. | |
| 2013/0257257 A1 | 10/2013 | Cur et al. | |
| 2013/0270732 A1 | 10/2013 | Wu et al. | |
| 2014/0260332 A1 | 9/2014 | Wu | |

FOREIGN PATENT DOCUMENTS

| | | |
|---|---|---|
| CN | 1158509 | 7/2004 |
| CN | 1970185 | 5/2007 |
| CN | 100359272 | 1/2008 |
| CN | 201680116 U | 12/2010 |
| CN | 102452522 | 5/2012 |
| DE | 19818890 A1 | 11/1999 |
| DE | 102010024951 | 12/2011 |
| EP | 0260699 A2 | 3/1988 |
| EP | 1087186 A2 | 3/2001 |

(56) References Cited

FOREIGN PATENT DOCUMENTS

| | | |
|---|---|---|
| EP | 1200785 | 5/2002 |
| EP | 1243880 A1 | 9/2002 |
| EP | 1496322 A1 | 1/2005 |
| EP | 1505359 | 2/2005 |
| EP | 2342511 A2 | 7/2011 |
| FR | 2980963 A1 | 4/2013 |
| GB | 837929 | 6/1960 |
| GB | 1214548 | 12/1970 |
| JP | 73028353 | 8/1973 |
| JP | 51057777 | 5/1976 |
| JP | S59191588 U | 12/1984 |
| JP | 403013779 A | 1/1991 |
| JP | 406159922 A | 6/1994 |
| JP | 7001479 A | 1/1995 |
| JP | 08300052 | 11/1996 |
| JP | 10113983 A | 5/1998 |
| JP | 11336990 A | 12/1999 |
| JP | 200097390 A | 4/2000 |
| JP | 2000117334 | 4/2000 |
| JP | 2001343176 | 12/2001 |
| JP | 03478771 | 12/2003 |
| JP | 2004303695 | 10/2004 |
| JP | 2005164193 | 6/2005 |
| JP | 2007263186 A | 10/2007 |
| JP | 2009162402 | 7/2009 |
| JP | 2010017437 A | 1/2010 |
| JP | 2010108199 A | 5/2010 |
| JP | 2010145002 | 7/2010 |
| JP | 04545126 B2 | 9/2010 |
| JP | 2010236770 | 10/2010 |
| JP | 2010276309 | 12/2010 |
| JP | 2011002033 A | 1/2011 |
| JP | 2011196644 | 10/2011 |
| JP | 2012026493 A | 2/2012 |
| JP | 04897473 B2 | 3/2012 |
| JP | 2012063029 A | 3/2012 |
| JP | 2012087993 | 5/2012 |
| JP | 2012163258 A | 8/2012 |
| JP | 2012242075 | 12/2012 |
| JP | 2013050242 A | 3/2013 |
| JP | 2013088036 A | 5/2013 |
| KR | 20020057547 A | 7/2002 |
| KR | 20040000126 | 1/2004 |
| KR | 1020080103845 A | 11/2008 |
| KR | 20120007241 A | 1/2012 |
| KR | 2012046621 A | 5/2012 |
| KR | 2012051305 A | 5/2012 |
| WO | 2010029730 A1 | 3/2010 |
| WO | 2010043009 A2 | 4/2010 |
| WO | WO2010092627 | 8/2010 |
| WO | WO2011003711 | 1/2011 |
| WO | 2011081498 A2 | 7/2011 |
| WO | 2012023705 A2 | 2/2012 |
| WO | WO2012026715 | 3/2012 |

OTHER PUBLICATIONS

International Patent Application No. PCT/US2013036203, filing date: Apr. 11, 2013, Applicant: Whirlpool Corporation, International Search Report and Opinion mail date: Jul. 26, 2013, 10 pages.
European Search Report, Application No. 4158615.6, Jun. 24, 2015, 5 pages.

* cited by examiner

FOLDED VACUUM INSULATED STRUCTURE

CROSS-REFERENCE TO RELATED APPLICATIONS

The present application is related to U.S. patent application Ser. No. 13/833,635 filed Mar. 15, 2013, entitled A METHOD TO CREATE VACUUM INSULATED CABINETS FOR REFRIGERATORS; and U.S. patent application Ser. No. 13/835,449 filed Mar. 15, 2013, entitled A VACUUM PANEL CABINET STRUCTURE FOR A REFRIGERATOR; and U.S. patent application Ser. No. 13/832,246 filed Mar. 15, 2013, entitled DUAL COOLING SYSTEMS TO MINIMIZE OFF-CYCLE MIGRATION LOSS IN REFRIGERATORS WITH A VACUUM INSULATED STRUCTURE; and U.S. patent application Ser. No. 13/833,696 filed Mar. 15, 2013, entitled VACUUM INSULATED DOOR STRUCTURE AND METHOD FOR THE CREATION THEREOF; and U.S. patent application Ser. No. 13/836,143 filed Mar. 15, 2013, entitled VACUUM INSULATED STRUCTURE TUBULAR CABINET CONSTRUCTION; and U.S. patent application Ser. No. 13/837,659 filed Mar. 15, 2013, entitled FOLDED VACUUM INSULATED STRUCTURE; and U.S. patent application Ser. No. 13/833,685 filed Mar. 15, 2013, entitled METHOD TO CREATE VACUUM INSULATED CABINETS FOR REFRIGERATORS, all of which are incorporated herein by reference in their entirety.

SUMMARY OF THE INVENTION

One aspect of the present invention is a vacuum insulated refrigerator cabinet structure. The cabinet structure includes a metal outer layer and a polymer inner layer. The inner and outer layers are spaced apart to form an insulation space. The insulation space is filled with a filler material, and a vacuum is formed in the space. During fabrication, a sheet metal layer is cut to form a blank. The sheet metal layer includes a layer of heat-sealable polymer material that is laminated to a first side of the sheet. A layer of polymer material including an impermeable layer of polymer material such as ethylene vinyl alcohol (EVOH) is heat-sealed to the metal/polymer blank. The resulting structure is then folded to form a cabinet structure having an "O" shape or a "U" shape. Additional insulated panels are then secured to the O or U-shaped primary structure to thereby form an insulated space.

These and other features, advantages, and objects of the present invention will be further understood and appreciated by those skilled in the art by reference to the following specification, claims, and appended drawings.

DETAILED DESCRIPTION

Figure 1:
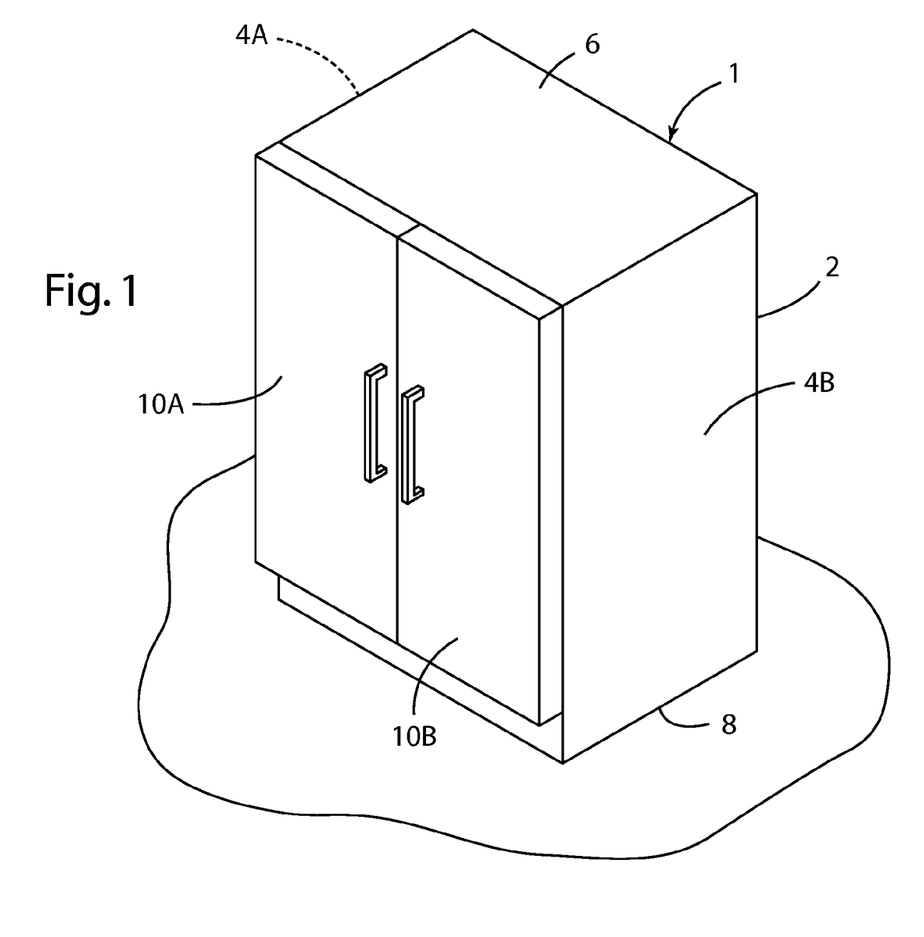
FIG. 1 is an isometric view of a refrigerator having a vacuum insulated cabinet structure according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a refrigerator 1 according to one aspect of the present invention includes an insulated cabinet 2 that generally includes vertical side walls 4A and 4B, a horizontal upper wall 6, and a horizontal lower wall 8. Doors WA and 10B are moveably mounted to the insulated cabinet 2 in a known manner. As discussed in more detail below, refrigerator 1 may include an "O" shaped primary structure 20A (FIG. 2), or it may include a U-shaped primary structure 20B (FIG. 4).

Figures 2, 3:
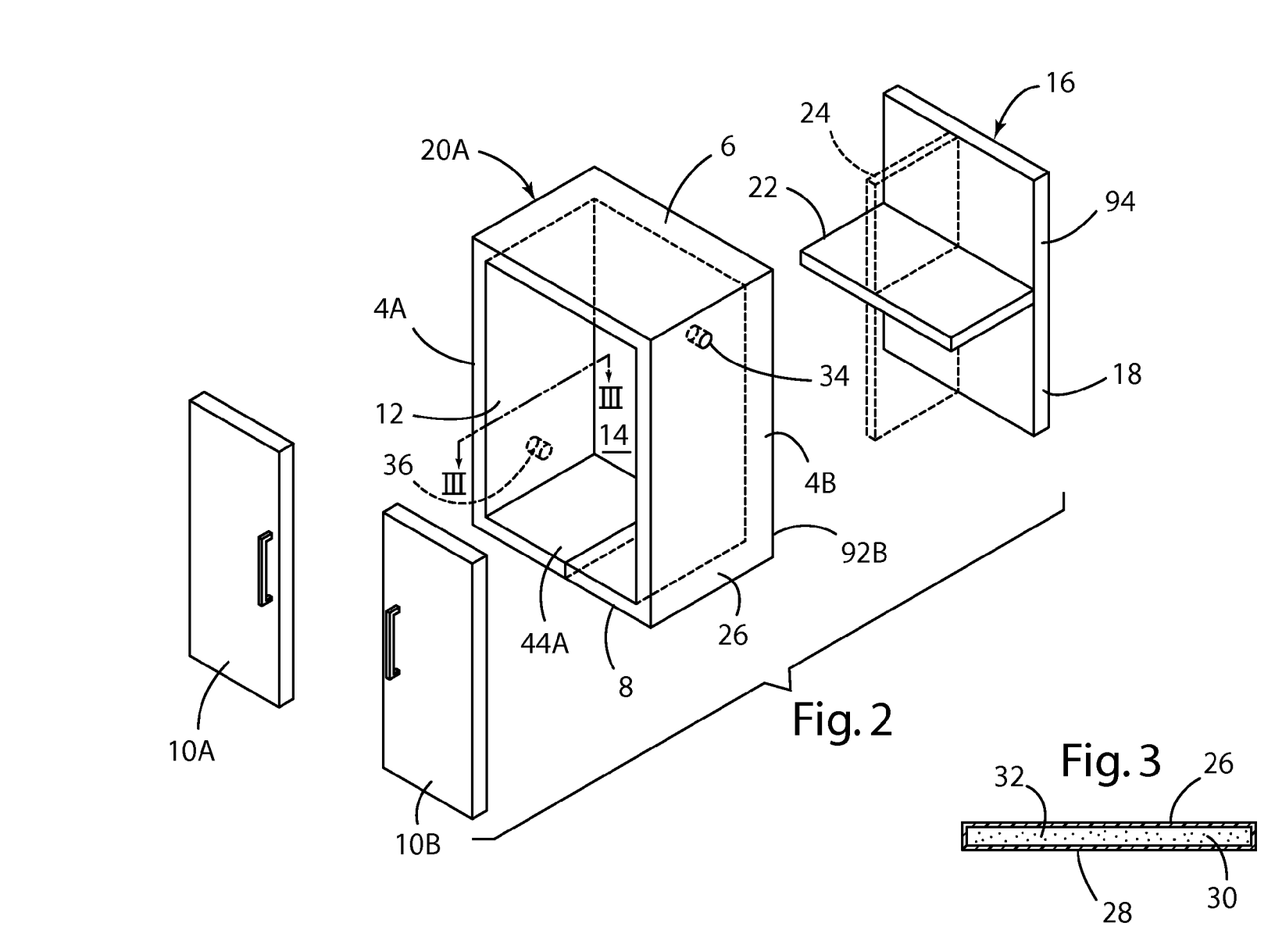
FIG. 2 is an exploded perspective view of a vacuum insulated cabinet structure having a O-shaped primary structure.
FIG. 3 is a cross-sectional view of the vacuum insulated cabinet structure of FIG. 2.

With reference to FIG. 2, O-shaped primary structure 20A defines enlarged front and rear openings 12 and 14, respectively. Doors 10A and 10B selectively close off the front opening 12, and a rear panel assembly 16 may be utilized to close off rear opening 14. Rear panel assembly 16 may include a vertical panel 18, and a horizontal divider 22 and/or a vertical divider 24. The divider 22 (or 24) may include a cooling module that coals the insulated space on opposite sides of the divider 22 (or 24). Examples of suitable cooling modules are disclosed in U.S. patent application Ser. No. 13/108,226 entitled "COOLING SYSTEM INTEGRATION ENABLING PLATFORM ARCHITECTURE" filed on May 16, 2011; U.S. patent application Ser. No. 13/108,293 entitled "FLEXIBLE COOLING SYSTEM INTEGRATION FOR MULTIPLE PLATFORMS" filed on May 16, 2011; and U.S. patent application Ser. No. 13/108,183 entitled "UNIVERSAL AND FLEXIBLE COOLING MODULE SET (CMS) CONFIGURATION AND ARCHITECTURE" filed on May 16, 2011. Each of these applications is hereby incorporated herein by reference in their entirety.

As discussed in more detail below, primary structure 20A includes an outer skin 26 and an inner skin 28. The outer skin 26 comprises a layer of sheet metal (e.g. low carbon steel) having a layer of heat-sealable polymer material laminated to one side of the layer of metal. Inner skin 28 comprises a layer of thermoplastic polymer such as high impact styrene and a barrier layer that may comprise polymer material such as ethylene vinyl alcohol (EVOH). The barrier layer forms a barrier with respect to gasses and water vapor. The polymer inner skin 28 is sealed to the polymer material of the outer skin 26 to form an insulation space 30 (FIG. 3). The polymer inner skin 28 is may be sealed to the polymer material of the outer skin 26 utilizing a heat seal process that softens or partially melts the polymer material of the skin 26 and/or skin 28. Heat can be generated using one or more conventional electrical resistance heating elements (not shown), or heat can be generated using ultrasonic processes. Mechanical pressure can also be used to seal the skins 26 and 28 together. Still further, adhesive or other suitable material can also be used to connect/seal skins 26 and 28 together. Powdered silica or other filler material 32 is disposed in the insulation space 30, and a vacuum is formed in the insulation space 30 to thereby provide a vacuum insulated structure. Openings or valves 34 and 36 may be utilized to blow the filler material 32 into the space 32 prior to forming a vacuum. The primary structure 20A may be placed in a vacuum chamber, and openings or valves 34 and 36 may then be closed to form a vacuum in the insulation space 30. Alternatively, as discussed in more detail below, the filler material 32 may be positioned in the insulation space 30 prior to interconnection of outer skin 26 and inner skin 28. The skins 26 and 28 sealed together in a vacuum chamber to form a vacuum in insulation space 30. If this process is utilized, the openings or valves 34 and 36 are not required.

Figure 4:
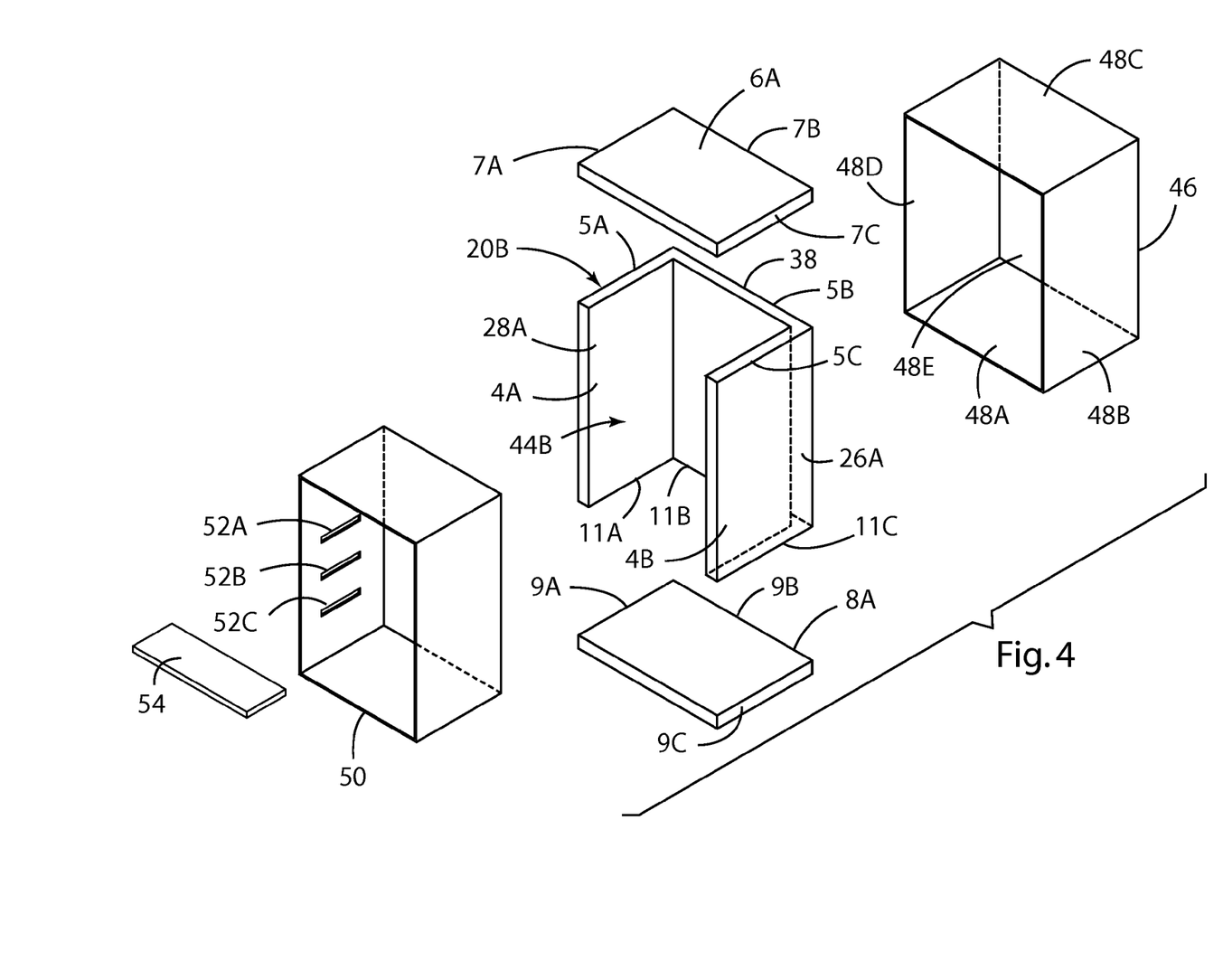
FIG. 4 is an exploded perspective view of an insulated cabinet structure having a U-shaped primary component.

With further reference to FIG. 4, a primary cabinet structure 20B according to another aspect of a present invention is substantially U-shaped, with side walls 4A and 4B extending from a rear wall 38. Upper and lower side walls 6A and 8A may comprise separate panels that are secured to the primary structure 20B to form an insulated space 44B. As discussed in more detail below, the primary structure 20B includes a metal outer skin 26 and a polymer inner skin 28 that are heat sealed together to form a vacuum in substantially the same manner as primary structure 20A. The upper side wall 6A or lower side wall 8A may include a cooling module as described above in connection with dividers 22 and 24. An outer optional cover 46 having side walls 48A-48D (and optionally 48E) may be utilized to form an outer decorative surface of the refrigerator to cover, for example, the joints between primary structure 20B and upper and lower walls 6A and 6B, respectively. The outer cover 46 is optional. A refrigerator including the primary structure 20A of FIG. 2 may also include an outer cover 46. A polymer liner 50 may also be disposed with the primary structure 20B. Polyurethane foam or the like may be injected into spaces between primary structure 20B and liner 50 to provide support for the polymer liner 50. The polymer liner 50 may include various features such as shelf supports 52A-52C that support shelves 54.

Figures 5, 6, 7:
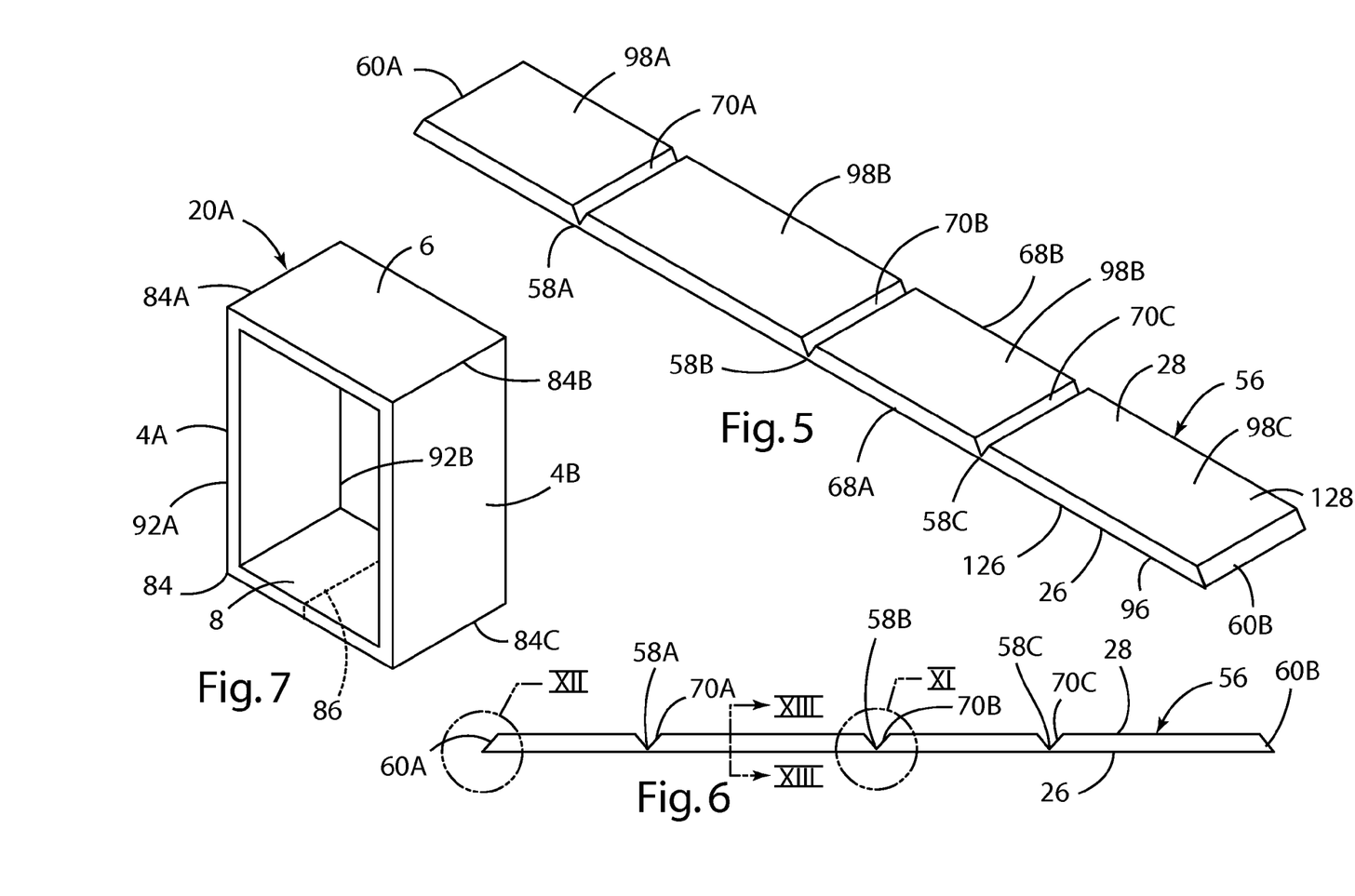
FIG. 5 is an isometric view of a subassembly that is folded to form an O-shaped primary structure.
FIG. 6 is an elevational view of the subassembly of FIG. 5.
FIG. 7 is an isometric view of a O-shaped vacuum insulated primary structure.

With further reference to FIGS. 5-7, O-shaped primary structure 20A is formed from a subassembly 56 that is folded along lines 58A-58C. The inner skin 28 may comprise a composite sheet having a layer of thermoplastic polymer material such as high impact polystyrene that is laminated to a thin barrier layer of polymer material. The thin barrier layer may comprise EVOH or other material (e.g. metal foil) capable of maintaining a vacuum in insulation space 30 for the life of the insulated cabinet structure. For example, the barrier layer may selected such that the thermal conductivity of the vacuum insulated structure does not exceed 200% of its initial value for at least 10 years.

Figure 11:
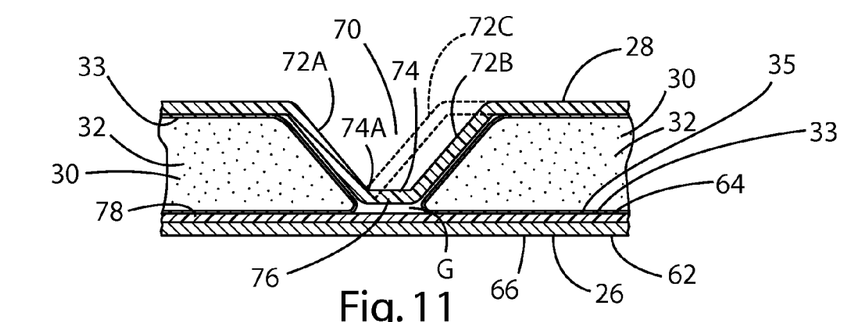
FIG. 11 is a cross-sectional view of a portion of the subassemblies of FIGS. 6 and 9.

With further reference to FIG. 11, the outer skin 26 may comprise a metal sheet 62. Metal sheet 62 may comprise low carbon steel or the like having a pre-painted outer surface 66. Outer skin 26 includes a layer of heat-sealable polymer material 64 that is laminated to the metal 62. The inner skin 28 may be thermoformed to form elongated shaped grooves 70A-70C having angled side walls 72A and 72B. The grooves 70 may include a flat side wall portion 74 extending between side walls 72A and 72B. The lower surface 76 of flat side wall portion 74 may be spaced apart from surface 78 of heat-sealable plastic 64 to form a gap "G". Alternately, the lower surface 76 may be in contact with surface 78, and a seal may be formed between the surfaces 76 and 78. Also, the angled side walls may form a "sharp" V 74A if groove 70 includes a side wall 72C as shown in dashed lines.

Figure 13:
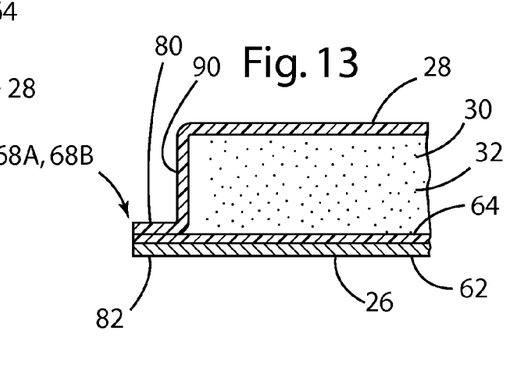
FIG. 13 is a partially fragmentary enlarged cross-sectional view of a portion of the subassemblies of FIGS. 6 and 9.

With further reference to FIG. 13, the outer skin 26 and inner skin 28 may be interconnected along the opposite side edges 68A and 68B of subassembly 56. Inner skin 26 may include an outwardly extending flange 80 that is heat-sealed to the polymer material 64 of outer skin 26 along edge 82 of outer skin 26.

Figure 12:
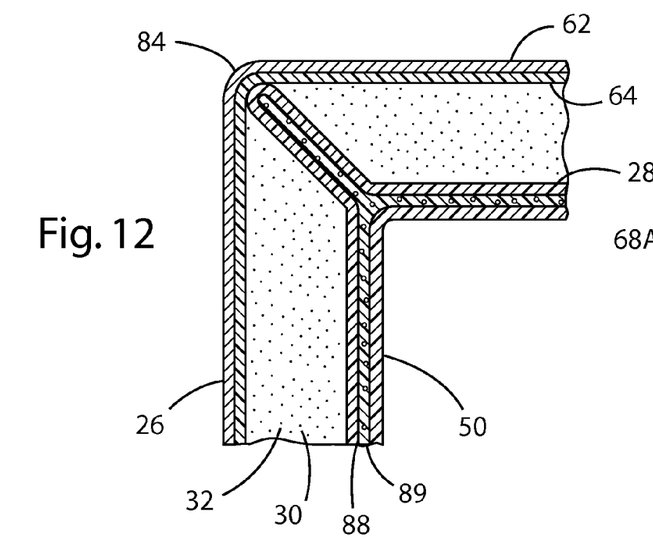
FIG. 12 is a cross-sectional view of a corner of the vacuum insulated primary structures of FIGS. 2 and 4.

Referring again to FIGS. 6 and 7, ends 60A and 60B of subassembly 56 may be angled at a 45 degree angle and joined together at a corner 84. Alternatively, the ends of 60A and 60B may be orthogonal, and joined along a center seam 86. If a seam 86 is utilized, the ends 60A and 60B may have a configuration that is substantially similar to the configuration of edges 68A and 68B (FIG. 13). When assembled, polyurethane foam 88 (FIG. 12) can be injected to fill gaps between polymer liner 50 and inner skin 28 and between ends 60A and 60B. Also, side wall 90 (FIG. 13) of inner skin 28 may be angled or beveled in a manner similar to the angled side walls 72A and 72B (FIG. 11) along one or both side edges 68A, 68B to provide an angled front edge 92A (FIG. 7) and/or angled rear edge 92B. Edges 94 of panel 18 (FIG. 2) may be beveled to fit closely with beveled or angled rear edges 92B of primary structure 20A. Polyurethane foam 88 (FIG. 12) may be injected between liner 50 and inner skin 28 to fill gaps at the joints between edge 92B of primary structure 20A and vertical panel 18.

Referring again to FIG. 5, during fabrication of primary structure 20A, a sheet of metal/plastic is cut to form a blank 126 having generally rectangular perimeter 96. As discussed above, skin 28 comprises a thermoplastic polymer material such a high impact polystyrene that is laminated to a relatively thin layer of EVOH or other suitable barrier material. It will be understood that the skin 28 may comprise multiple layers of material, and the EVOH layer may be sandwiched between adjacent layers of thermoplastic polymer material. The polymer material of the inner skin 28 is thermoformed utilizing known processes and tools to form a polymer blank 128 that includes the grooves 70A and 70C and side walls 90 (FIG. 13) and flanges 80. The polymer blank 128 is then positioned on the outer blank 126. The filler material 32 may be positioned in cavities 30 prior to positioning polymer blank 128 on metal blank 126. For example, one or more pouches 33 containing filler material 32 may be placed on metal blank 126. The pouches 33 may comprise a single elongated pouch having a generally rectangular perimeter that is positioned adjacent rectangular parameter 96 of outer skin blank 126. Alternately, a plurality of individual pouches 33 having shapes corresponding to individual panel sections 98A-98C may be positioned on the metal blank 126. The pouches 33 may comprise an outer layer of paper or other permeable material 35 that permits airflow, but retains filler material 32. If a single elongated pouch 33 is utilized, the pouch may be compressed at the V-grooves 70A-70C such that the regions of the pouch 33 in the vicinity of the gap G (FIG. 11) are thin. Alternately, if a plurality of individual pouches 33 are utilized, the polymer blank 128 can be sealed to outer skin blank 126 along the V-grooves 70.

After placing polymer blank 128 over pouches 33 on metal blank 126, the metal blank 126 and polymer 128 are then positioned in a vacuum chamber (not shown). The polymer blank 128 is sealed to polymer material 64 of outer skin blank 126 along flanges 80 to thereby form an air-tight seal around insulation spaces 30. The polymer blank 128 is also sealed to metal blank 126 at V-grooves 70 if necessary for a particular application. The entire perimeter 96 of subassembly 56 can be sealed in the vacuum chamber. Alternately, a portion of the rectangular perimeter 96 may be sealed prior to positioning the blanks 126 and 128 in the vacuum chamber, and the remaining portion of the perimeter 96 can be sealed in the vacuum chamber. Also, a plurality of the subassemblies 56 can be positioned in a single vacuum chamber in a stacked relationship, and the blanks 126 and 128 of the subassemblies 56 can be sealed in the vacuum chamber. As discussed above, the blanks 126 and 128 can be connected/sealed utilizing a heat seal process, mechanical pressure, adhesives, or other suitable processes/materials.

After the subassembly 56 is removed from the vacuum chamber, it can be folded along the V-grooves 70A-70C to form a primary structure 20A (FIG. 7). The ends 60A and 60B can be adhesively interconnected or otherwise secured together. A forming tool (not shown) can be positioned in the V-grooves 70A-70C during the bending process. Also, the blank 56 may optionally be heated in the vicinity of V-grooves 70A-70C to facilitate bending at the grooves 70A-70C. The rear panel assembly 16 may then be secured to the primary structure 20A (FIG. 2). A polymer liner 50 may optionally be inserted into the primary structure 20A, and polyurethane foam 88 may be injected into the space 89 between inner skin 28 and polymer liner 50.

The filler material 32 may be positioned between the metal blank 126 and polymer blank 128 prior to the sealing operation as just described. Alternately, the outer metal blank 126 may be sealed to the polymer blank 128 under atmospheric conditions. The subassembly 56 can then be folded to form primary structure 20A. The filler material 32 can then be blown into the spaces 30 utilizing one or more openings or valves 34 and 36 (FIG. 2). For example, a filter (not shown) may be placed over opening 36, and filler material 32 may be blown into the spaces 30 utilizing opening 34. The filter over opening 36 permits air to flow out of the internal space 30, thereby compacting the filler material 32 in spaces 30. The primary structure 20A can then be placed in a vacuum chamber, and the openings 34 and 36 can then be closed off. The structure 20A can be moved from the vacuum chamber. It will be understood that each panel section 98A-98C (FIG. 5) may include both an inlet opening 34 and an outlet opening 36 if filler material 32 is blown into spaces 30 after folding blanks 56.

Figure 8:
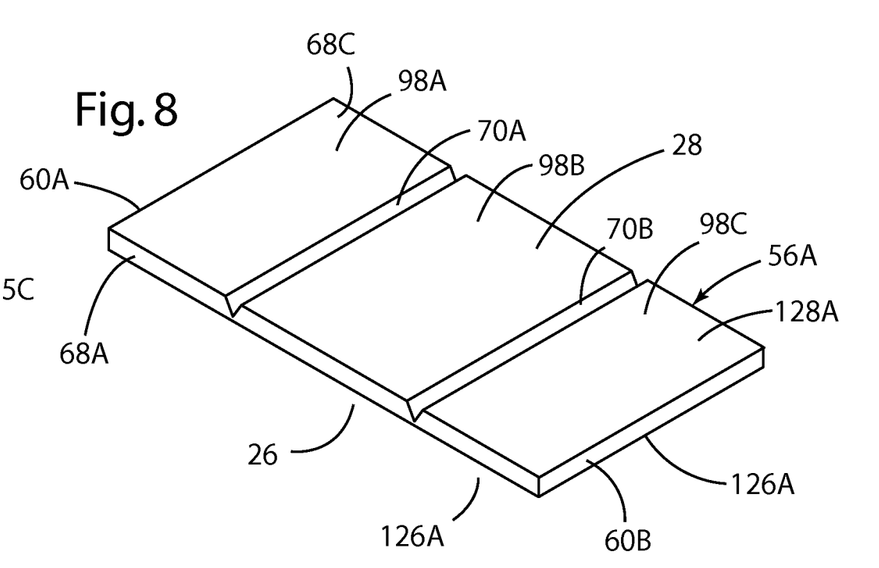
FIG. 8 is an isometric view of a subassembly used to fabricate a U-shaped primary vacuum insulated structure.
Figure 9:
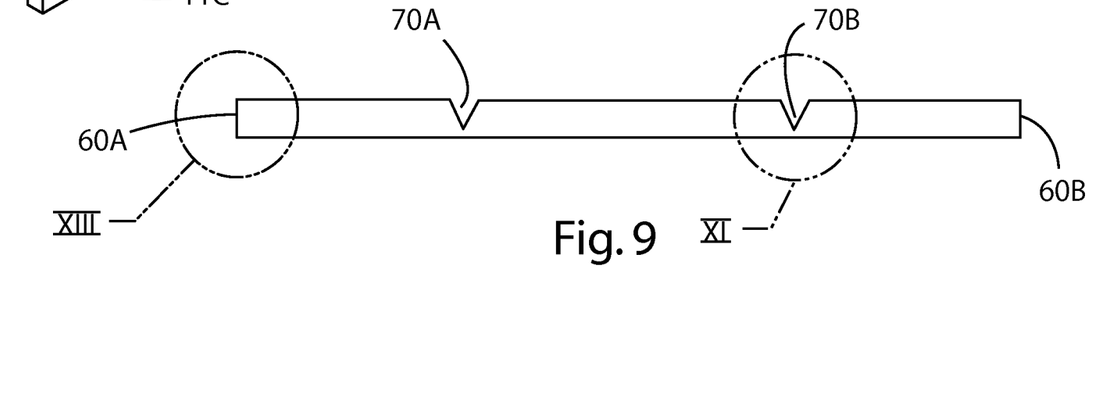
FIG. 9 is an elevational view of the subassembly of FIG. 8.
Figure 10:
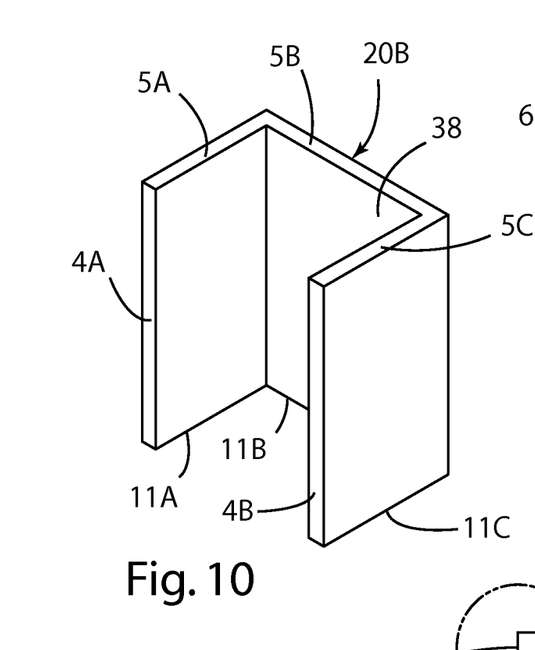
FIG. 10 is an isometric view of a U-shaped vacuum insulated primary structure.

With further reference to FIGS. 8-10, a U-shaped primary structure 20B (see also FIG. 4) may be formed utilizing a metal blank 126A and a polymer blank 128A in substantially the same manner as described above in connection with FIGS. 5-7. The polymer blank 128 includes three panel sections 98A-98C corresponding to the three side walls 4A, 38 and 4B of U-shaped primary structure 20B (FIG. 10). After formation of primary structure 20B, an upper wall 6A and lower wall 8A are secured to the U-shaped primary structure 20B (FIG. 4). The side wall 90 (FIG. 13) along side edges 68A and 68B (FIG. 8) of inner skin blank 128 may be angled at, for example, a 45 degree angle (i.e. similar to side wall 72B of FIG. 11), such that upper edges 5A-5C (FIG. 10) and lower edges 11A-11C of primary structure 20B are beveled or angled. Similarly, side edges 7A-7C of upper wall 6A (FIG. 4) and edges 9A-9C of lower wall 8A may also be beveled. Thus, when assembled, the edges 7A-7C of upper wall 6A fit closely against upper edges 5A-5C of primary structure 20B, and side edges 9A-9C of lower wall 8A fit closely in side edges 11A-11C of U-shaped primary structure 20B. Polyurethane foam 88 (FIG. 12) can be utilized to fill any spaces that may exist at the joints formed between upper wall 6A and primary structure 20B, as well as gaps at joints between lower wall 8A and primary structure 20B.

Figures 14, 15, 16:
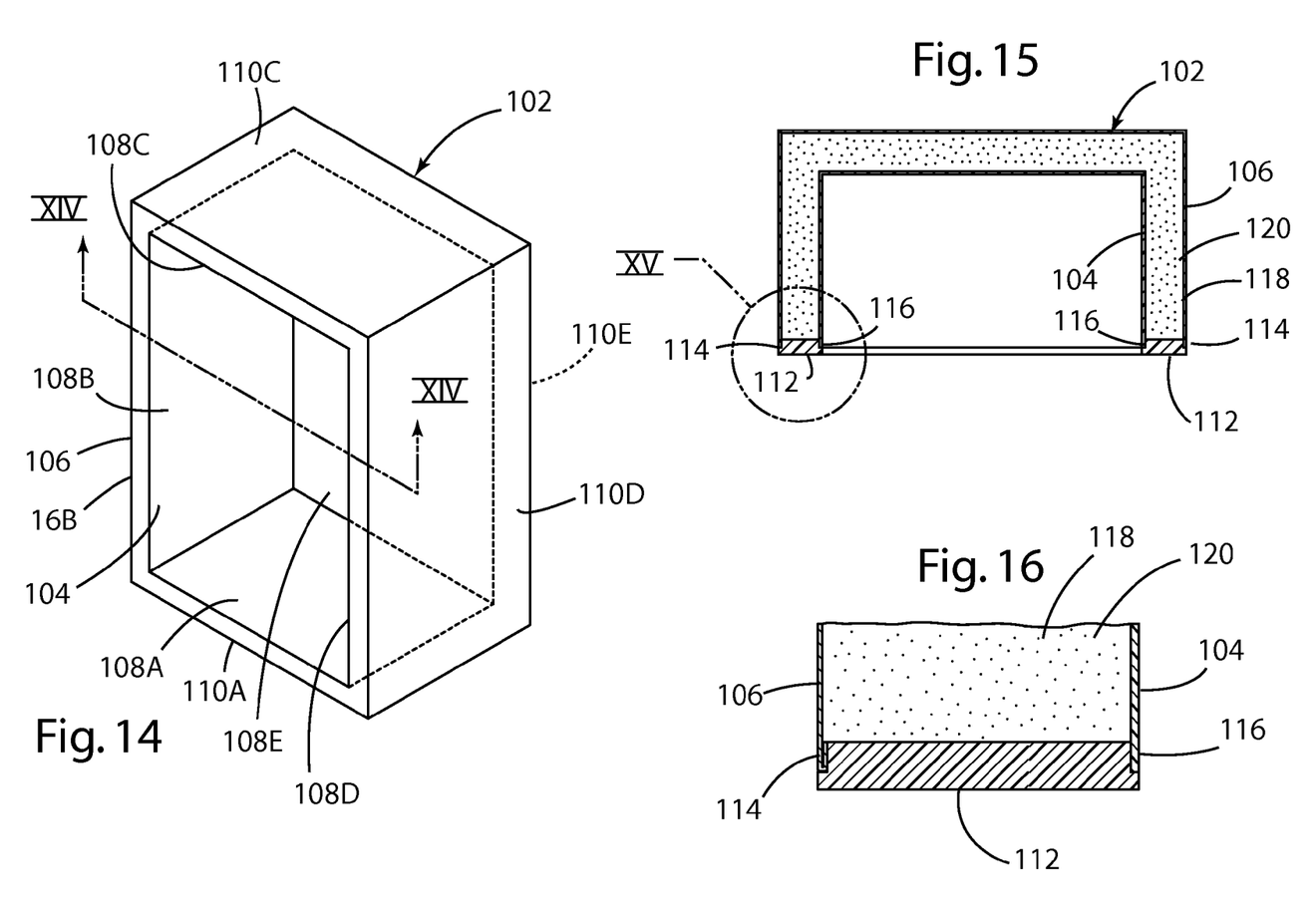
FIG. 14 is an isometric view of a vacuum insulated cabinet structure according to another aspect of the present invention.
FIG. 15 is a cross-sectional view of the vacuum insulated cabinet structure of FIG. 14.
FIG. 16 is partially fragmentary enlarged view of a portion of the vacuum insulated cabinet structure of FIG. 15.

With further reference to FIGS. 14-16, a vacuum insulated cabinet 102 according to another aspect of the present invention includes an inner member 104, and an outer member 106. Inner member 104 may comprise a one-piece metal structure having including integrally formed side walls 108A-108E, and outer member 106 may comprise a one-piece metal member having side walls 110A-110E. In general, inner and outer members 104 and 106 may both be formed from a single piece of sheet metal utilizing a drawing process, or one or both of the inner and outer members 104 and 106 may be thermoformed from a sheet of polymer material. If inner member 104 or outer member 106 is formed of a polymer material, the polymer material preferably includes a barrier layer such as EVOH or metal foil, and one or more layers of thermoplastic material.

After inner member 104 and outer member 106 are formed, inner member 104 is positioned inside outer member 106, and an elongated edge member 112 is connected to the inner member 104 and outer member 106 along edges 114 and 116 to thereby form a space 118 between inner member 104 and outer member 106. The edge member 112 may comprise an extruded polymer material, and preferably includes one or more layers of impermeable material such as EVOH and layers of regions of thermoplastic polymer material. The edge member 112 may be sealingly connected to the edges 114 and 116 utilizing adhesive sealant or other suitable material. Also, inner member 104 and/or outer member 106 may comprise a metal sheet having a layer of heat-sealable polymer material laminated to a side face of the material, and the edges 114 and 116 may be heat-sealed to edge member 112. Alternately, inner member 104 and/or outer member 106 may comprise a polymer material and the edges 114 and 116 can be heat-sealed to edge member 112. If inner member 104 and outer member 106 comprise sheet metal, the edge member 112 provides a thermal break, thereby reducing or preventing conductive heat transfer between inner member 104 and outer member 106.

Filler material 120 is disposed in insulating space 118. The filler material may comprise silica or other porous material capable of supporting the inner and outer members 104 and 106 when a vacuum is formed in the insulating space 118.

During assembly, the inner member 104, outer member 106, and edge member 112 may be positioned in a vacuum chamber, and filler material 120 may be disposed and compacted in space 118. The edge member 112 may then be sealingly connected to the inner member 104 and outer member 106, and the cabinet 102 can then be removed from the vacuum chamber. Alternately, one or more openings or valves 34 and 36 (FIG. 2) can be utilized to blow filler material 120 into insulating space 118, and the openings can then be sealed off before removal of the cabinet 102 from a vacuum chamber.

The invention claimed is:

1. A method of forming a vacuum insulated cabinet structure, the method comprising:

forming a generally rectangular first blank from a sheet of material that includes a metal layer and a thermoplastic polymer layer;

forming a generally rectangular second blank from a sheet of material that includes a layer of thermoplastic polymer material and a layer of material that is substantially impermeable, wherein the second blank includes a plurality of shallow pockets that open towards a first side of the second blank, the second blank including at least one groove extending between opposite side edges of the second blank to form a divider between adjacent shallow pockets;

positioning the first and second blanks directly adjacent one another such that the first blank substantially closes off the shallow pockets;

providing a porous filler material in the pockets;

positioning the first and second blanks in a vacuum chamber;

sealing the second blank to the thermoplastic layer of the first blank such that the shallow pockets form sealed vacuum spaces;

folding the first and second blanks along the groove.

2. The method of claim 1, wherein:
The second blank comprises a layer of EVOH material.

3. The method of claim 1, wherein:
the metal layer comprises low carbon steel.

4. The method of claim 1, wherein:
the second blank includes a generally rectangular perimeter and an outwardly-extending flange at the perimeter.

5. The method of claim 4, including:
heat-sealing the flange to the thermoplastic polymer layer of the first blank.

6. The method of claim 1, wherein:
the second blank is sealed to the first blank along the groove.

7. The method of claim 1, wherein:
the second blank includes a plurality of generally planar dies wall portions having substantially rectangular perimeters.

8. The method of claim 7, wherein:
the second blank includes edge wall portions extending at approximately 45 degree angles relative to the generally planar side wall portions to define the groove.

9. The method of claim 1, wherein:
the second blank includes first and second grooves extending between opposite side edges of the second blank;
the first and second blanks are folded along the first and second grooves to form a generally U-shaped primary cabinet structure.

10. The method of claim 9, wherein:
the cabinet structure defines upper and lower U-shaped opposite side edges;
and including:
securing an upper insulated panel to the upper side edge;
securing a lower insulated panel to the lower side edge to thereby define a cabinet structure having an inner side surface facing an enlarged interior space.

11. The method of claim 10, including:
forming a polymer liner;
positioning the liner in the enlarged interior space;
providing thermosetting form insulation between the polymer liner and the inner side surface of the cabinet structure.

12. The method of claim 10, including:
providing at least one of the upper and lower insulated panels with a powered cooling module that cools the enlarged interior space.

13. The method of claim 1, wherein:
the first and second blanks each include first and second opposite ends; and
including:
forming at least three grooves in the second blank;
folding the first and second blanks in at least three places to form four side walls, including first and second upright side walls and vertically spaced apart upper and lower side walls extending between the first and second upright side walls;
connecting the first and second opposite ends of the first and second blanks together to form a primary cabinet structure having vertically enlarged front and read openings.

14. The method of claim 13, including:
securing an insulated panel to the primary cabinet structure to close off the rear opening and form an insulated space.

15. The method of claim 14, including:
positioning a divider in the insulated space to form first and second compartments, wherein the divider includes a cooling module that cools the first and second compartments.

* * * * *